UNITED STATES PATENT OFFICE.

FRANK S. WASHBURN, OF NASHVILLE, TENNESSEE.

FERTILIZER AND PROCESS FOR PRODUCING THE SAME.

1,103,115.   Specification of Letters Patent.   Patented July 14, 1914.

No Drawing.   Application filed March 13, 1914.   Serial No. 824,517.

*To all whom it may concern:*

Be it known that I, FRANK S. WASHBURN, a citizen of the United States, and a resident of Nashville, Tennessee, have invented certain new and useful Improvements in Fertilizers and Processes for Producing the Same, of which the following is a specification.

This invention relates to fertilizers containing mixtures of ammonia and phosphoric acid and processes of producing the same, and has for its object to provide a process which will be efficient and certain in operation as well as a product which will be highly concentrated and will contain no acids which will be deleterious to the soil.

With these and other objects in view the invention consists in the novel steps and combinations of steps constituting my process and in the novel product all as will be more fully hereinafter disclosed and particularly pointed out in the claims.

In carrying out my process, I take ordinary phosphate rock, such as is now used in the fertilizer industry, finely divide the same and treat it with sufficient sulfuric acid ($H_2SO_4$) to liberate substantially all the contained phosphoric acid, thus producing a crude solution of phosphoric acid which can be readily separated out in any suitable and well known manner, as by filtration from the insoluble residue. The crude phosphoric acid thus obtained will contain as impurities, soluble compounds containing iron and aluminum probably in the form of phosphates and sulfates, as well as small amounts of calcium sulfate.

An actual analysis of such a solution made on a commercial scale was found to contain the following:—

| | |
|---|---|
| $P_2O_5$ | 17.00% |
| $Fe''$ | 0.25% |
| $Fe'''$ | 0.28% |
| $Al_2O_3$ | 1.70% |
| CaO | A trace. |
| $H_2SO_4$ (free) | 0.60% |

In making the above solution the concentration of the sulfuric acid was not as high as it might have been. In making other solutions I have used higher concentrations of sulfuric acid and of course obtained higher percentages of phosphoric acid and also larger percentages of the above impurities. If I use a sufficiently concentrated sulfuric acid I can obtain 20% or higher of phosphoric acid and in such cases the concentration of the impurities to the $P_2O_5$ increases in an accelerated ratio.

I prefer to employ as high a concentration of sulfuric acid as commercial considerations will permit, for the greater percentages of impurities which follow are not injurious to my process, while the getting rid of the water or the lessening of the water in the solution on the other hand is very advantageous as will presently appear. Nor does an excess of sulfuric acid in the solution interfere with my process as will likewise appear below.

Having produced a solution of crude phosphoric acid with as little water as commercial requirements will permit, I next bring the same into contact with ammonia as by feeding this said crude solution into a tank containing aqua ammonia charged with ammonia gas, whereupon I have discovered that the reaction velocity will be so great that the insoluble products formed consisting of phosphates of aluminum, iron and ammonia separate out in a gelatinous mass, and which mass will be found to be completely soluble in the standard ammonium citrate solutions used for determining the agricultural availability of phosphate compounds. The other constitutents of the solution consisting principally of ammonium phosphate, of course, are available as a plant food, and as the above gelatinous mass is also available as above demonstrated, all the phosphoric acid in the original solution is thus rendered available as a plant food. In practice however, there is no need to separate this gelatinous mass from the solution, and I therefore prefer to merely evaporate the solution containing said mass to dryness in any suitable manner, whereupon, I have my new product in the form of a dry powder containing as its essential ingredients ammonia and phosphoric acid in an available form to be used as a fertilizer.

It is a very important feature of my invention that the crude phosphoric acid solution is fed to the ammonia instead of the ammonia being fed to the said crude solution. For if the latter procedure is followed, as has been heretofore proposed, there will result a series of products more or less insoluble in ammonium citrate, and therefore not available as a plant food. In fact by following a reversal of my process as has been heretofore proposed by others, and working on a commercial scale, only about ninety per cent. (90%) of the phosphoric acid in the said crude solution is rendered available as a fertilizer instead of substantially one hundred (100%) as is the case in my process. Further by employing a concentrated sulfuric acid in the first instance, as above stated, a comparatively concentrated crude solution is produced and less evaporation is found to be necessary to produce the finished product.

The reason for the difference in results between my process and the said reversed process proposed by others, so far as I am able to explain, resides in the fact that when the crude solution is fed to the concentrated ammonia solution, a small quantity of crude acid comes into contact with a large quantity of concentrated ammonia, and consequently a different series of products follows from those resulting from the feeding of a small quantity of concentrated ammonia solution to a large quantity of crude acid solution. In other words an important feature of my invention resides in the fact that I keep an excess of ammonia in contact with my crude phosphoric acid. It will thus be seen in fact that almost any process by which an excess of ammonia is kept in contact with my crude phosphoric acid will produce my results, and in practice I prefer to feed ammonia gas to a tank containing mono-ammonium phosphate until it is converted into di-ammonium phosphate, and then add my crude solution of phosphoric acid until the said di-ammonium phosphate has been transformed back into the mono form. Whereupon I remove a portion of the solution consisting largely of ammonium phosphate and containing the above gelatinous precipitate to the evaporator, and again saturate the remaining mono solution until it again becomes diammonium phosphate whereupon the process is repeated.

It should be observed that the product obtained by my process is an almost white amorphous powder while that obtained by the reversed procedure is of a greenish gray or a gray color. It will be further observed that my product consists of a water soluble constituent consisting of ammonium phosphate mixed with the gelatinous constituents insoluble in water but citrate soluble and consisting of the above metal phosphates of iron and aluminum which are likewise available as a plant food.

It is obvious that those skilled in the art may vary the details of my invention without departing from the spirit thereof, and therefore I do not wish to be limited to the above disclosure except as may be required by the claims.

What I claim is:—

1. The process of rendering available as a plant food the phosphoric acid contained in phosphate rock which consists in treating said rock with sulfuric acid to obtain a crude solution of phosphoric acid and then feeding said crude solution to a second solution containing an excess of ammonia, substantially as described.

2. The process of rendering available as a plant food the phosphoric acid contained in phosphate rock which consists in treating said rock with sulfuric acid to form a crude solution of phosphoric acid; and then feeding said crude solution to a solution containing di-ammonium phosphate, substantially as described.

3. The process of rendering available as a plant food the phosphoric acid contained in phosphate rock which consists in treating said rock with sulfuric acid to form a crude solution of phosphoric acid; and then feeding said crude solution to a solution of mono-ammonium phosphate containing di-ammonium phosphate, substantially as described.

4. The herein described new fertilizer consisting substantially of an amorphous light colored material containing phosphates of ammonia and iron and substantially devoid of constituents unavailable as a plant food, substantially as described.

5. The herein described new fertilizer substantially devoid of constituents not available as a plant food, consisting essentially of ammonium phosphate mixed with small quantities of aluminum and iron phosphate, substantially as described.

6. The herein described new fertilizer substantially devoid of constituents unavailable as a plant food consisting essentially of ammonium phosphate mixed with a metal phosphate as an impurity, substantially as described.

7. The herein described new fertilizer substantially devoid of constituents unavailable as a plant food and consisting of an ammonium phosphate mixed with a water insoluble phosphate but which latter is citrate soluble, substantially as described.

8. The herein described new fertilizer substantially devoid of constituents unavailable as a plant food consisting essentially of ammonium phosphate mixed with a metal phosphate, a part of the phosphoric acid being in a water soluble form and a part in a citrate soluble form, substantially as described.

In testimony whereof, I hereby sign my name this the 9th day of March, 1914, in the presence of two witnesses.

FRANK S. WASHBURN.

Witnesses:
T. A. WITHERSPOON,
G. M. SCHURMAN.